Figure 5:
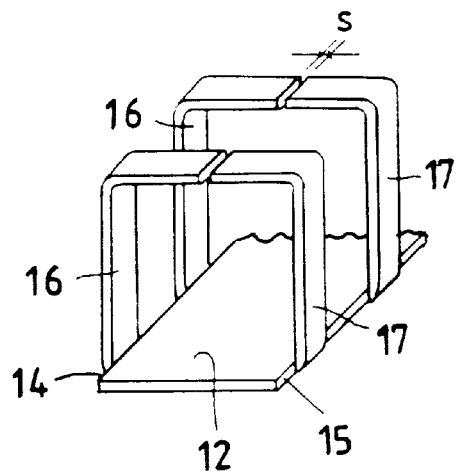

United States Patent [19]
Baldissara

[11] Patent Number: 6,140,584
[45] Date of Patent: Oct. 31, 2000

[54] FLEXIBLE CABLE-RUN FOR THE CONTAINMENT OF ELECTRICAL CABLES AND THE LIKE

[76] Inventor: Fausto Baldissara, Viale Alfieri 6/bis, Busto Arsizio (Varese), Italy

[21] Appl. No.: 09/120,600

[22] Filed: Jul. 22, 1998

[30] Foreign Application Priority Data

Jul. 24, 1997 [IT] Italy .................................. MI970565 U

[51] Int. Cl.[7] .................................................. H02G 3/04
[52] U.S. Cl. ........................................ 174/68.3; 174/72 A
[58] Field of Search .................................. 174/68.3, 68.1, 174/71 R, 72 R, 72 A, 96, 97, 98, 95, 100, 101, 72 C, 135, 136

[56] References Cited

U.S. PATENT DOCUMENTS

| | | | |
|---|---|---|---|
| 4,484,020 | 11/1984 | Loof et al. ............................ | 174/68 C |
| 4,669,507 | 6/1987 | Moritz ................................... | 138/92 |
| 5,086,195 | 2/1992 | Claisse .................................. | 174/101 |

FOREIGN PATENT DOCUMENTS

| | | | |
|---|---|---|---|
| 0259418 | 12/1963 | Australia ............................. | 174/68.3 |
| 4205293A1 | 8/1993 | Germany ............................. | 174/101 |

*Primary Examiner*—Kristine Kincaid
*Assistant Examiner*—W. David Walkenhorst
*Attorney, Agent, or Firm*—Hedman, Gibson & Costigan

[57] ABSTRACT

A flexible cable-run for the containment of electrical cables and similar of a type including a base (12) fitted with a plurality of fin elements (16, 17; 116, 117, 216, 217, 316, 317) extending along its longitudinal edges (14, 15) so as to form parts of the walls of a cable run (11) in which the plurality of fin elements (16; 116; 216; 316) are rigidly connected to an edge (14) and have a free extremity, opposite to the one connected to the edge (14) that either faces directly the extremity of the plurality of fin elements (17; 117; 217; 317) of the other edge (15) or enters the space "d" provided between one or more successive fin elements extending from the opposite edge, so that the extremities are arranged along a single plane.

4 Claims, 2 Drawing Sheets

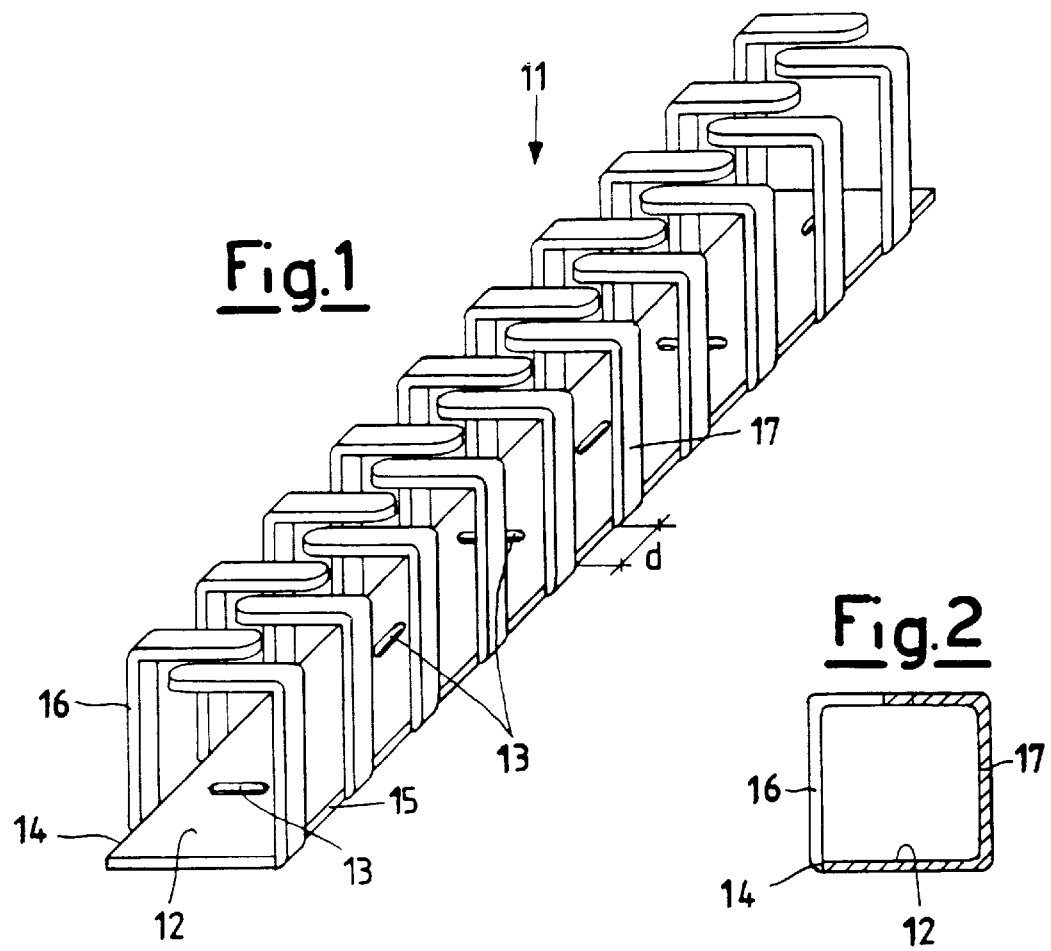
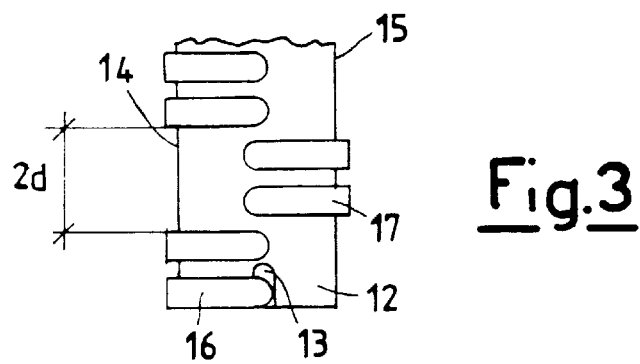
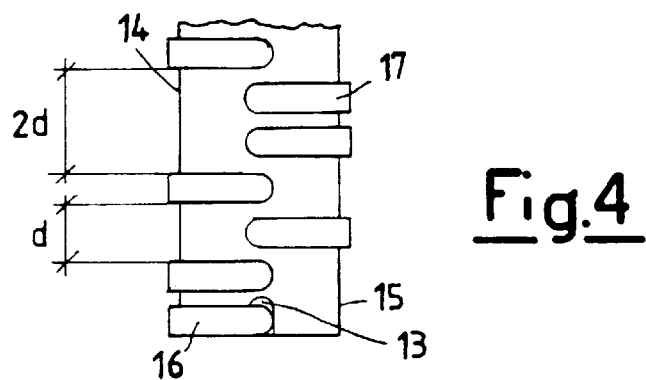

FLEXIBLE CABLE-RUN FOR THE CONTAINMENT OF ELECTRICAL CABLES AND THE LIKE

This invention relates to a flexible cable-run for the containment of electrical cables and the like.

The flexible cable-runs known and in use are molded from a thermoplastic material and suitable for the containment of electrical and/or similar cables.

These known cable-runs may have any cross-section, such as of a circular, oval, rectangular, square or other shape.

If for example and for the sake of simplicity the four sides of a known cable-run with a square cross-section are considered, it can be seen to be composed as follows.

The cable-run has a flat base similar to a strip, eventually fitted with holes of various shape and size, suitable for producing points allowing it to be easily fastened to the inside of the equipment to be wired.

From the flat strip-type base, along its longitudinal edges, two opposing flanks are perpendicularly extended and formed by a series of fin elements set side-by-side and alternative with empty spaces.

In this known cable-run it can be noted that the upper side is formed by the same fin elements which continue while bending by 90° on two different parallel levels, while superposing each other. In fact, the fin elements on one side bend at a certain height, while those on the other side bend at a different height and are thus superposed at their terminal portions.

Once installed, this type of cable-run works well, but it suffers from certain shortcomings during its production.

In fact, the arrangement of the extremities of the fin elements opposing and superposing each other demands a composite mold, which is particularly complex to use and costly to fabricate.

At present these molds must be built with the aid of the two lateral trolleys, which are essential to complete the shape of the cable-run, in addition to the two traditional half-shells which must be opened to allow to expel the cable-runs at the end of the molding process. This occurs after a hydraulic jack has raised the inner male portion, guided by appropriate stroking rails that completely remove it from the mold over its entire length, which corresponds to at least the length of the cable-run being molded.

Moreover, such a cable-run also takes up a certain space, which is precisely increased by the superposition of the extremities of the fin elements extending from the two flanks of the longitudinal base.

A general scope of this invention is to produce a flexible cable-run for the containment of electrical cables and the like, capable of overcoming all the shortcomings previously outlined.

Another scope is to produce a cable-run of limited cost and extremely simple structure.

A further scope is that of simplifying, wherever possible, the construction of such a cable-run, as well as of its molds and whatever may be associated with them.

An additional scope is to produce a flexible cable-run for the containment of electrical cables and the like taking up the least possible space with respect to those already known.

Figure 6:
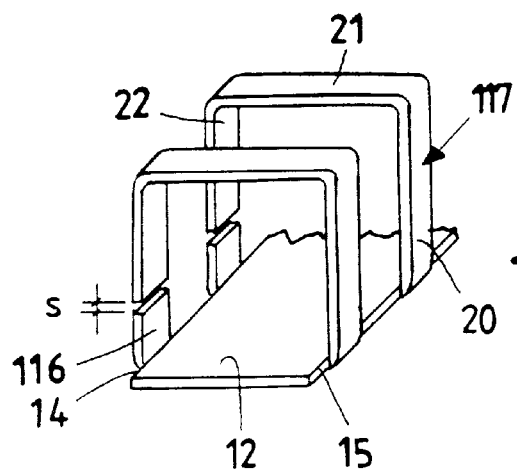
Figure 7:
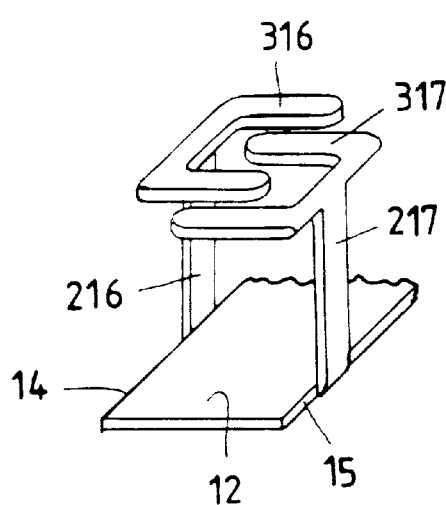

These scopes according this invention are achieved by producing a flexible cable-run for the containment of electrical cables and similar of a type comprising a base fitted with a plurality of fin elements extending along its longitudinal edges, so as to form parts of the walls of a cable run in which said plurality of fin elements are rigidly connected to an edge and have a free extremity, opposite to the one connected to the edge that either faces directly the extremity of the plurality of fin elements of the other edge or enters the space "d" provided between one or more successive fin elements extending from said opposite edge, so that the extremities are arranged along a single plane.

the characteristics and advantages of a flexible cable-run for the containment of electrical cables and the like according to this invention will become more evident from the following exemplifying and non-limiting description, referred to the accompanying simplified drawings, in which:

FIG. 1 is a perspective view of a portion of a flexible cable-run for the containment of electrical cables and the like according to this invention, FIG. 2 is a transversal cross-section of the cable-run in FIG. 1, FIGS. 3 and 4 are top views of two further embodiments of a flexible cable-run according to this invention, FIGS. 5, 6 and 7 are perspective views of additional examples of a flexible cable-run according to this invention.

The reference to the figures allows to see the general structure of a flexible cable-run for the containment of electrical cables and the like according to this invention and indicated in its overall form by 11.

In the example shown in the FIGS. 1 and 2, it can be noted that the cable-run 11 presents an essentially square cross-section that comprises a longitudinal base 12.

This longitudinal base 12 may be fitted with contoured holes 13 of various size and shape, so as to create points capable of allowing it to be fastened inside the equipment to be wired, or where such a cable-run 11 must be installed.

From this longitudinal base 12, a plurality of fin elements 16 and 17 are perpendicularly extended along its longitudinal edges 14 and 15, thus forming a portion of the wall of the cable-run 11. These fin elements 16 and 17 are arranged along each of its edges 14 and 15 in a side-by-side manner and spaced-out individually or in clusters at a certain distance or space indicated by "d".

The fin elements 16 and 17 have a free extremity, opposite to that connected to the edges 14 and 15, which either faces directly the extremity of the fin element of the other edge, or enters the space "d" provided between one or more of the successive fin elements extending from the opposite side. This space is at least equal to the width of a single fin element.

In this manner the fin elements produce a portion of the cable-run, having in this example a square cross-section but which may likewise, according to the same innovative concept of this invention, have a different configuration featuring a cross section of any type, circular, oval, rectangular or other.

FIGS. 1 and 2 show that the fin elements 16 of the edge 14 are in the portion of their upper extremity bent at 90° with respect to the vertical extending from the edge 14 and partially inserted in the spaces "d" left open by the fin elements 17, which are in turn bent 90° with respect to the edge 15 and facing the first fin elements 16.

In this manner the vertical portions of the fin elements 16 and 17 form the sides of the section of the cable-run and the bent portions form the upper side of the same cable-run. The fin elements 16 extending from an edge 14 are of the same length as the fin elements 17 extending form the opposite edge 15.

The elasticity of the material used to produce the cable-run obviously allows the introduction of the cables, after removing the extremities of the opposing fin elements 16 and 17 inserted in a zig-zag fashion between them.

A limited height of the cable-run is obtained, while at the same time ensuring a perfect containment of the cables.

It is worth noting, moreover, that the cable-run 11, or a side-by-side alternating arrangement of the fin elements on a single plane in the upper part as shown in the example, allows three advantages.

It actually provides for a lesser outer encumbrance of the cable-run, having the same internal cross section with respect to those mentioned and known, and consequently having the same capacity to contain electrical cables, thanks to the absence of superposed fin elements.

Moreover, it is easier to manually insert and extract the cables from the cable-run, while still guaranteeing a lock against their occasional and/or accidental escape, thanks to the appropriate sizing of the length of the final portion of the fin elements in the upper part of the same cable-run.

It is also worth noting that this simplifies the construction of the mold for fabricating the cable-run, which having only two half-shells and no trolleys, allows to simplify both the construction as well as the molding of the cable-run.

It is in fact possible to prepare several impressions of a single cable-run in the same mold, with a production rate as many times greater as the number of impressions. This is particularly the case when taking into account that the present construction of a known cable-run having superposed fin element extremities allows to mold only one piece at a time.

There will also be an improvement of the extraction cycle of the cable-run, because the same is allowed to slide downward while holding the male inner part firm, instead of raising the male part and blocking the cable run.

As already pointed out, these cable-runs can also have any kind of cross-section, such as of a circular, oval, rectangular, square or other shape.

FIGS. 3 and 4 are top plan views of two possible additional examples of a cable-run according to the invention, which utilizes the same innovative concept of making the extremities of the fin elements available side-by-side in a single plane and alternating in a variable manner so as to close the portion of the flexible cable-run.

It can thus be noted that in FIG. 3 from a base 12 some pairs of fin elements 16 and 17 extend from opposite edges 14 and 15 so as to produce a space "2d" between successive pairs on the same side.

FIG. 4 shows that it is possible to provide a fin element 16 alternating with a space "d" followed by a pair of fin elements 16 alternating with a space "2d" and so on, repeating the series. The same can of course be provided for he opposite side fitted with the fin elements 17.

FIG. 5 shows an extremely simplified form, in which the fin elements 16 and 17 are simply facing each other and arranged with the extremities of the fin elements in a single plane. In this example a tiny interspace "s" is left between their facing points, thus leaving a certain space "d" between the fin elements on the same side.

FIG. 6 shows a somewhat more complex form, in which some extremely short fin elements 116 extend over a small vertical stretch from an edge 14 of one side. Some other fin elements 117 extend from the other edge 15 and comprise a vertical portion 20, an upper horizontal portion 21 as well as an additional vertical portion 22 whose extremity faces the extremities of the ribs 116 spaced out by a small distance "s". In this form the ribs can also be provided in an offset manner, i.e. spaced out and alternated between each other in a partially opposed arrangement of their extremities. In this example, the fin elements 117 extending from an edge 15 have a much greater length than the fin elements 116 extending from the opposite edge 14.

FIG. 7 shows a further example in which some vertical portions of the fin elements 216 and 217 extend from each opposite edge 14 and 15 of the base 12, so as to later branch out to a pair of fin element extremities 316 and 317 also placed side-by-side. This case also achieves an arrangement whereby the extremities of the offset ribs are partially set side-by-side in a single plane.

What is claimed is:

1. A flexible cable-run for the containment of electrical cables comprising a base (12) from which a plurality of fin elements (16, 17; 117; 216, 316, 317) extend along its longitudinal edges (14, 15), so a to form parts of the walls of a cable run (11) characterized in that said plurality of fin elements (16; 116; 216; 316) are rigidly connected to an edge (14) and have a free extremity, opposite to the one connected to said edge (14) that enters the space "d" or 2"d" provided between one or more successive fin elements (17; 117; 317) of the other edge (15) so that said extremities are arranged along a single plane.

2. A flexible cable-run according to claim 1, characterized in that said fin elements (16, 216, 316) extending from one edge (14) are spaced out by a distance at least equal to the width of one of said fin element (17, 217, 317) extending from an opposite edge (15) of said base (12).

3. A flexible cable-run according to claim 1, characterized in that said fin elements (117) extending from one edge (14) have a greater length than that of said fin elements (116) extending from an opposite edge (15).

4. A flexible cable-run according to claim 1, characterized in that said fin elements (16, 17, 116, 216, 316, 317) form the edges of a portion of said cable-run.

* * * * *